(12) United States Patent
Jacobsen et al.

(10) Patent No.: US 8,715,045 B2
(45) Date of Patent: May 6, 2014

(54) FISH FILLETING MACHINE

(75) Inventors: Preben Holm Jacobsen, Sæby (DK); Bjarne Kjeld Jakobsen, Nibe (DK)

(73) Assignee: Marel Salmon A/S, Norresundby (DK)

( * ) Notice: Subject to any disclaimer, the term of this patent is extended or adjusted under 35 U.S.C. 154(b) by 0 days.

(21) Appl. No.: 13/885,035

(22) PCT Filed: Nov. 11, 2011

(86) PCT No.: PCT/DK2011/050429
§ 371 (c)(1),
(2), (4) Date: Jul. 22, 2013

(87) PCT Pub. No.: WO2012/062331
PCT Pub. Date: May 18, 2012

(65) Prior Publication Data
US 2013/0295829 A1 Nov. 7, 2013

(30) Foreign Application Priority Data
Nov. 12, 2010 (DK) .................. 2010 01035

(51) Int. Cl.
*A22C 25/00* (2006.01)
(52) U.S. Cl.
USPC ......................................... 452/157
(58) Field of Classification Search
USPC ................. 452/149–153, 156, 157, 161
See application file for complete search history.

(56) References Cited

U.S. PATENT DOCUMENTS

| | | | |
|---|---|---|---|
| 2,479,010 A | 8/1949 | Jones | |
| 3,596,308 A | 8/1971 | Kenney | |
| 4,336,634 A * | 6/1982 | Braeger | 452/135 |
| 4,534,085 A | 8/1985 | Stewart | |
| 4,748,721 A * | 6/1988 | Braeger | 452/127 |
| 4,748,723 A * | 6/1988 | Braeger et al. | 452/122 |
| 5,106,335 A * | 4/1992 | Behnk et al. | 452/162 |
| 5,536,205 A * | 7/1996 | Braeger et al. | 452/161 |
| 5,735,735 A * | 4/1998 | Hahn et al. | 452/119 |
| 5,830,052 A * | 11/1998 | Wadsworth | 452/161 |
| 5,871,395 A * | 2/1999 | Grabau et al. | 452/162 |
| 6,200,211 B1 * | 3/2001 | Braeger et al. | 452/162 |
| 6,280,313 B1 * | 8/2001 | Braeger et al. | 452/161 |
| 6,322,437 B1 * | 11/2001 | Grabau et al. | 452/161 |
| 6,604,991 B1 * | 8/2003 | Jurs et al. | 452/150 |
| 7,927,194 B2 * | 4/2011 | Jurs et al. | 452/135 |

FOREIGN PATENT DOCUMENTS

| | | |
|---|---|---|
| GB | 811199 | 4/1959 |
| GB | 973213 | 10/1964 |
| GB | 2089642 | 6/1982 |
| WO | 9417670 | 8/1994 |
| WO | 200404140 | 2/2004 |
| WO | 2004064529 | 8/2004 |

* cited by examiner

*Primary Examiner* — Richard Price, Jr.
(74) *Attorney, Agent, or Firm* — James Creighton Wray (57) ABSTRACT

A machine has stations for continuous fish filleting. Decapitated gutted fish are placed with backs upwards and fronts foremost. A first station engages the fish and centers the fish relative to a vertical plane. Lower sides of the fish are arranged on opposite sides of the plane. A second station detects and registers vertical extents of lower edges and backs of the fish. A third station fixates backs of the fish and cuts slits in the backs. The slits extend at least along either side of protruding back fins. A fourth station has articulated cutters arranged on either side of the vertical plane for trimming parts of lowermost sides and edges of the fish. A fifth station has upper cutters positioned along the vertical plane for cutting meat free from vertebrae. A sixth station cuts vertically on either side of the vertebrae. A seventh station directs fillets outward.

13 Claims, 6 Drawing Sheets

FISH FILLETING MACHINE

This application claims the benefit of Danish Application No. PA 2010 01035 filed Nov. 12, 2010, and PCT/DK2011/050429 filed Nov. 11, 2011, International Publication No. WO 2012/062331, which are hereby incorporated by reference in their entirety as if fully set forth herein.

FIELD OF THE INVENTION

The present invention relates to a machine for filleting fish, in particular to a machine for cutting fillets from the backbones of fish.

BACKGROUND OF THE INVENTION

Fish processing operations typically include removal of the heads and the fish entrails. Subsequently, the fish is split longitudinally and vertically into three pieces, two side-pieces, fish fillets, and one intermediate "carcass" piece containing the backbone or vertebrae.

In the following context, the anatomy of the fish will be referred to as follows: The spine part of the fish is the part extending upwardly from the backbone to the upper back of the fish. The abdomen part of the fish is the part extending downward from the backbone to the abdomen or belly. The centre plan is a longitudinally extending vertical plane intersecting through the middle of the backbone in the middle in between the two fillets. The fillets are the pieces of meat arising when the fish is split as described above, i.e. longitudinally and vertically along each sides of the backbone thus splitting the fish into two fillets (side-pieces) and one carcass part comprising the backbone. The carcass is merely used for industrial purposes, e.g. for making fishmeal etc. while the two side-pieces represent the valuable part of the fish and may be further processed, e.g. by smoking.

In general, the process of filleting fish is widely automated. In existing machines, one or more knife arrangements cut the fish into fillets either by cutting from one side of the fish throughout the fish or by cutting partly from the abdomen side and partly from the spinal side of the fish. Most frequently, filleting machines are provided with one or more sets of two adjacent circular rotating saw blades. Obviously, the rotating saw blades perform a plane cut into the fish. In order not to loose too much fish meat, some machines are provided with a set of disks being arranged to form an angle therein between, so that the blades in one end defines a relatively open gab therein between and in a diametrically opposite end a relatively narrow gap therein between. In that way, the set of two blades can cut a triangular carcass part out of the fish relatively narrow to the backbone. However, mainly due to the fact that each blade performs a plane cut, relatively large amounts of the meat, especially in the abdomen part of the fish (the part extending downward from the backbone), is cut off from the valuable fillets and removed with the valueless carcass part.

New developments have generated machines using relatively flexible rotating band saws, i.e. closed-loop belts with a very sharp front edge. These belts are characterised by allowing cutting in slightly curved shapes. During the cutting, a fish is advanced in between two band saws. When the backbone has entered in between the two band saws, the two bands are pressed towards each other, e.g. by means of squeezing nippers. Due to a combination of the stiffness of the backbone and the angle of the knife edges of the bands, each of the bands will follow the backbone smoothly. The widest gap between the bands exists where the bands are held separated by the backbone. From this point, the bands, both upwards towards the spine part and downwards towards the abdomen part, follow a curve so that the gap between the bands, near the back of the fish and near the belly of the fish, is almost eliminated. The squeezing nippers are typically arranged above and below the fish (in close vicinity to the fish). Due to the curved configuration of the cutting bands, the cutting may be performed closely around the backbone and in a curve towards the centre plane of the fish. Accordingly, it is possibly with a band-saw machine to fillet the fish with a larger amount of the meat on the fillets.

However, even with the band-saw machines, a fair amount of meat is disposed with the carcass, the main reason being that the two band saws cannot be pressed closer together than the width of the spine of the fish.

GB 973.213 describes a method and an apparatus for filleting fish, wherein the fish, in particular herrings, is filleted by using firstly a rotating knife for cutting an incision in the spine part of the fish. Then the side fillets are cut away from the carcass by use of two oppositely arranged band saws. However, this single knife can only be used for fish having hair-like fishbone in the spine part. The way of using only one knife does not allow for cutting the fillets free on both side of fishbone in the spine part, which is necessary when filleting fish with large, thick and stiff fishbone in the spine part, such as Salmonidae or Gadidae. Further, it is not possible to cut away the dorsal fin from the spine part by using one knife, as the bone of fin extending into the spine part must be cut on each side in order to remove it from the fillet.

U.S. Pat. No. 4,534,085, U.S. Pat. No. 3,596,308 and WO 94/17670 all relate to apparatuses, wherein the fish is filleted by use of two oppositely arranged band saws cutting the fillets on each side of the carcass.

U.S. Pat. No. 2,479,010 discloses a filleting machine, wherein the head and tail is removed first, and the fillets are then cut away by use of two rotating knives.

GB 811.199 discloses an apparatus, wherein the fillets are removed from the carcass by use of two rotating knives positioned just above the fish, which is transported on a conveyor.

In the applicant's own, earlier published PCT-application, WO 2004/014140, is described a fish filleting machine for cutting fillets from the backbone of a fish, the machine comprising a fish supporter feed line for feeding fish through the machine and through mutually adjacent band saws arranged along said feed line. The band saws' function is to cut on respective sides of the backbone of a fish for filleting the abdomen bone part of the fish and separating the fish into two fish fillets and a carcass. This machine greatly improved the yield over prior art machines in that the saw blades are urged together thereby being curved, such that the saw blades better conforms to the shape of the bones of the fish, and thereby achieves a closer cut, leaving less valuable meat on the carcass.

Spine cutting means are arranged along the feed line, and before the band saws in a feeding direction of the feed line where the spine cutting means comprise two mutually adjacent cutting blades for cutting of incisions in the spine part of the fish.

This apparatus, although going a long way towards providing an automatic fish filleting machine due to the special arrangement of the band saws, still leaves a substantial amount of meat on the carcass.

OBJECT OF THE INVENTION

It is an object of the present invention to provide a filleting machine that fillets fish with a minimum of waste meat, in particular fish with large and robust fishbones in the spine part, such as Salmonidae and Gadidae.

It is a further object of the present invention to provide a filleting machine which is easy to maintain and clean.

DESCRIPTION OF THE INVENTION

The present invention overcomes the above-described disadvantages of the known fish-cutting machines by providing a fish-filleting machine comprising:
- a first station comprising means for engaging the fish and centring said fish relative to a vertical plane of the machine, such that lower sides of the fish are arranged on opposite sides of said plane;
- a second station comprising means for detecting and registering the vertical extent of the lower edges of the fish and the fish back;
- a third station comprising means for fixating the fish back, and cutting means for cutting slits in the fish back, said slits having an extent at least along either side of the protruding back fin;
- a fourth station comprising articulated cutting means, where said articulated cutting means are arranged on either side of the vertical plane, suitable for cutting/trimming at least a part of the lowermost sides and/or edges of the fish;
- a fifth station where upper cutting means are positioned along the vertical plane for cutting the fish meat free from the vertebrae of the fish;
- a sixth station comprising means for cutting vertically on either side of the vertebrae
- a seventh station for directing the bone-free fillets to further processing The seven stations of the inventive fish filleting machine ensure that an effective filleting process, i.e. a filleting process where a minimum of waste meat is left on the fishbone/carcass, is accomplished.

Furthermore, as part of the further processing, once the fillets have been separated from the carcass/fish bones of the prior art devices and in particular where the fish is salmon, is to trim the lower extremities of the fillets in order to remove excessive fat. By the present invention the second and fourth station carries out this trimming during the advancement of the fish through the fish filleting machine.

Consequently, the fish fillets being filleted by the inventive machine are more or less completely finished by the time they leave the machine.

It shall also be noted that the inventive machine according to the invention process the fish with the right side up, i.e. the back fin is arranged up.

In a further advantageous embodiment the means in the first station are two guiding members having facing curved surfaces, substantially corresponding to the shape of an upper part of a fish' back, where said members are biased towards each other, and where a vertically arranged and moveable plate member is arranged, which plate member, as a fish is introduced between the guiding members, is elevated inside the fish, thereby forcing and fixating the fish at a determined height.

By this arrangement it is achieved that the fish is more or less fixated in the machine such that it is possible with great certainty to establish the geometric configuration of the fish to be filleted in order for the cutting actions and trimming in the further stations to be carried out as optimal as possible. In this connection "fixated" means that the vertical position of the fish relative to the machine and thereby the various tools, as will be discussed below, is fixed. The fish will however move in a direction through the machine. In other words the Y-position is determined, whereas the X-position will change as the fish progresses through the machine.

By maintaining the fish in a fixated position very precise cutting may be carried out.

Fish, for example salmon and other similar fish, will normally have a more or less standardized size such that a three kilo fish will have certain exterior dimensions which are almost constant for all three kilo fish of the species deriving from the same location. Naturally, fish from different locations may have different geometry and yet have the same weight. As most of this is known beforehand, it is possible to programme the machine to very precisely cut in the right places and trim very precisely as well.

Alternatively the width of the fish may be used to determine the input parameters to the various cutting means. The width is registered in the first station as the fish enters the machine. The computer software will hereafter automatically adjust all relevant positions of the cutting means in the machine accordingly. Although weight for a certain species from the same location is a good indicator as to geometrical dimensions of the fish there are still variations.

By measuring the width, and the length (as explained below) the important input data relating to a specific fish are obtained, and may be used as input for the rest of the procedure.

In a still further advantageous embodiment of the invention the second station comprises means for registering the vertical extent of the fish's lower edges relative to the fish back, where said registering means comprises pivotal members, where the first pivotal member is arranged above the fish, in the vertical plane, where the member is biased to be in contact with the fish back, and where second pivotal members are arranged adjacent the lower edges of the fish, such that the second pivotal members may pivot about a substantially horizontal axis in order to register the vertical extent of the lower extent of the fish.

In this embodiment the registration of the extent of the lower edges of the fish as well as the back and their mutual placement are registered by pivotal members which are biased to come into contact with the lower respectively the upper extremities of the fish and due to the pivotable feature variations will be registered as a turning of the axis to which the pivotal members are fastened.

Although a mechanical solution as described above with reference to the embodiment has a number of advantages and is very reliable in use, it is also contemplated within the scope of the invention that non-contact means such as for example lasers or vision-based means may be used in order to determine the actual geometrical size of the sides of the fish relative to the back in order to use this information as input for the trimming knives in the fourth station (see below).

In this manner, as the fish is about to exit the second station, geometrical data relating to that particular fish have been detected and registered and furthermore the fish is fixated both in a vertical plane and in a horizontal plane such that any cutting operations in the following stations may be carried out with a high degree of certainty that a cutting/trimming in desired positions is achieved.

In a still further advantageous embodiment of the invention the cutting means in the third station is two rotating knives arranged at an adjustable oblique angle, where fin guiding means are provided immediately upstream from the rotating knives.

In this configuration it is possible to fixate the back of the fish such that the back fin due to the means for fixing the fin are arranged in a position where it is possible for the rotating knives to cut the fin from the fish. At the same time the angle between the two rotating knives may be adjusted depending on the particular species of fish.

For most salmon types the angle will be maintained at approx. 90° whereby a consistent and reliable cut is made in order to remove the fin. The tissue immediately adjacent the fin is typically fat or other undesirable tissue, and as such by cutting at a 90° angle most of this undesired tissue is removed together with the fin.

In a further advantageous embodiment of the invention the cutting means are arranged on a unit which unit may be elevated/lowered relative to the cutting position.

With this configuration it is possible to precisely position the cutting means such that they create the optimal cut irrespective of the size of the fish being processed in the fish filleting machine. For various fish sizes the vertical distance between the fish fin and the interior of the back bone may vary and by being able to adjust the elevation of the cutting means and thereby the cutting position a more optimum cut (i.e. cutting the undesired matter away and leaving valuable meat) may be performed along the fish fin, and as such a better productivity is achieved.

In a still further advantageous embodiment of the invention the articulated cutting means in the fourth station are independently controllable, where input from the detecting means in the second station is used to control the cutting line of the articulated cutting means.

The trimming of the lower part of the fish fillet is the most difficult one in that the cutting line undulates up and down and as such the control of the articulated cutting means must be very precise. At the same time the cutting line may be different from the right side respectively left side of the fish such that it is necessary to independently control the articulated cutting means. This is achieved in this embodiment by using the input from the detection means in the second station to independently control the articulated cutting means along the projected cutting line derived by the use of input from the detecting means in the second station.

The articulated cutting means may however be controlled by the same parameters, i.e. they will follow the same cutting profile on each side.

In addition to the input from the second station the control parameters to the articulated cutting means and thereby the determination of the optimal cutting line may also be influenced by data relating to that particular fish species, weight category and empiric data derived from measuring a multitude of the same type of fish, i.e. the same species arriving from the same destination in the same weight category.

In a still further advantageous embodiment of the invention the articulated cutting means is controllable in three dimensions and the cutters are rotating disc cutters, where the plane of the disc is controllable in response to input from the detection means.

The cutting means may also be adjusted in a constant height/level, such that all fish are provided with the same cut. This is especially advantageous when the machine is running at high processing speeds.

This is a further enhancement of the embodiment discussed above in that with articulated cutting means being controllable in three dimensions it is possible to angle the cut slightly whereby only undesired fat/meat is cut away without sacrificing any other valuable meat.

In at still further embodiment of the invention, the fifth station is the upper cutting means in the shape of two rotating knives, their planes arranged in parallel, where the distance between the planes of the knives substantially corresponds to the width of the vertebra/spine, and where the upper knives are guided by input from the detecting means in the second station in order to determine their cutting depth.

These cutting means cut very close on either side of the vertebrae such that the meat close to the vertebrae, as the fish fillet in a further station is separated from the fish bones, will comprise as much meat as possible, in that substantially no meat will be left on the vertebrae due to the cutting of the knives. By determining the cutting depth, again by the detecting means in the second station it is possible to cut very closely to the softer bones surrounding the abdomen of the fish and in this manner create an optimal filleting of the fish.

In order to cut the fillet free from the bone structure the sixth station is provided with two mutually adjacent band-saws which are arranged on either side of a vertical plane, their cutting edges facing the fifth station, and where means are provided for urging the band saws towards each other.

The arrangement with the vertical band-saws corresponds to the applicant's prior published PCT-application PCT/DK2004/000020 which is hereby incorporated by reference. As is evident from the prior application the band-saws facilitate a very clean cut due to the pressure and curvature of the band-saw on the fish bone structure. In this manner the fish fillet, after having travelled through six stations of the inventive apparatus has been separated from the bones with a minimum of wasted valuable meat.

In a still further advantageous embodiment one or more biased horizontal ribs are arranged on either side of the vertical plane for urging the fish against the vertical plane.

In order to achieve a precise processing through the fish filleting machine operating the various cutting means as discussed above, it is important that the fish is as fixated as possible relative to the vertical plane which is the plane relative to which most of the cutting operations are adjusted. On the other hand it is not desirable to put too much pressure on the fish meat in that this pressure may damage the meat and as such devaluate the fish. The biased horizontal ribs are therefore arranged with such a biasing force, for example created by a spring, that the fish is substantially fixated, but will still be able to move forward through the machine without damaging the meat.

In a still further advantageous embodiment of the invention two endless belts are arranged symmetrically about said vertical plane, i.e. one on either side, where each endless belt is arranged for rotation around two substantially vertical axles, such that the endless belt in use comes into engagement with the side of the fish and urges the fish against the vertical plane, and as the belts are rotated, the fish moves through the filleting machine.

The endless belts are provided in order to have a steady progress through the fish filleting machine. At the same time, by knowing the precise position of the belt and thereby the fish the input used for the various stations is determined very accurately.

In a still further advantageous embodiment a computing unit is provided, where said computing unit is pre-programmed with data relating to typical fish shapes, i.e. data relating to length, height, width, dependent on fish weight, where an operator may select a certain weight class for a batch of fish to be treated, whereby the different stations are pre-positioned accordingly, and where input from the detection and registering unit is used as input in order to output correct control and operating parameters for the various means in the various stations.

Alternatively in a second mode, the width of the fish to be treated is registered and automatically entered as input in the software controlling the different stations, whereby the stations are controlled according to specific parameters relating to the present fish to be treated.

In a still further advantageous embodiment a further mechanism is provided downstream from the sixth station, which mechanism comprises an endless belt which is arranged to engage the fillets as they leave the sixth station, and mirror-image fillet guiding structure below said endless belt, such that each fillet is guided to further processing skin side down.

In this manner the fish fillets substantially free of bones and with a trimmed lower edge are placed for example on a further endless conveyor transporting the fish fillets for further processing is placed in the endless conveyor with their skin sides down.

DESCRIPTION OF THE DRAWING

The invention will now be explained with reference to a filleting machine as depicted in the accompanying drawing wherein.

DETAILED DESCRIPTION OF THE INVENTION

Figure 1:
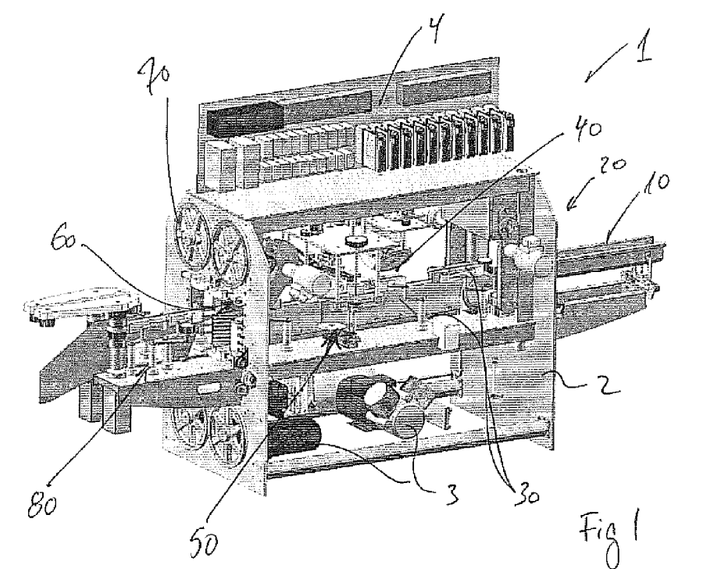
FIGS. 1, 2 and 9 illustrates isometric illustrations of a machine according to the invention.
Figure 2:
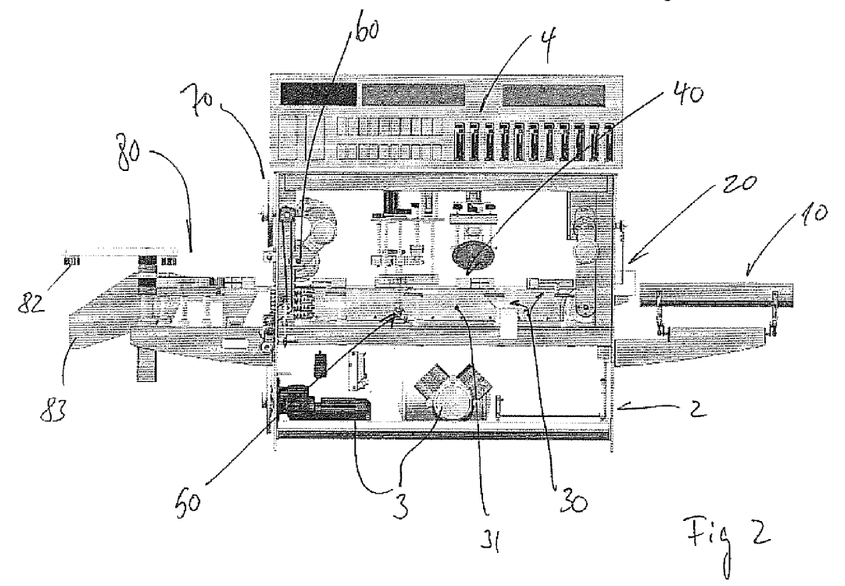

In FIGS. 1 and 2 are illustrated a fish fillet machine according to a preferred embodiment. The machine 1 is depicted without a substantial number of parts which could interfere with the understanding of how the machine works. Below the important parts will be explained with reference to the drawing.

Basically the machine comprises a chassis 2 where the chassis serves to elevate the work level such that it will be possible to fit the fillet machine into a normal production line and at the same time the elevation gives room beneath the work line for various motors 3 etc. necessary for powering the fish filleting machine as will be described below.

Above the chassis 2 is arranged the necessary electronic equipment 4 which is used to control the entire process of filleting the fish. In use this equipment is protected by covers, doors and the like.

The machine comprises an in-feed channel 10 arranged in a first end of the machine. In this embodiment the in-feed channel is in the shape of a U-shaped profile, where the fish to be filleted are arranged such that the back fin is upwards and the front of the fish without the head portion which has been removed prior to being introduced into the machine 1 is facing the machine.

As the fish progresses through the machine 1 it will pass a number of stations 20, 30, 40 50, 60, 70, 80 and eventually the fish fillets free from bones will be delivered to an endless conveyor belt for further processing.

Below the different stations will be described with reference to the relevant figures.

Figure 3:
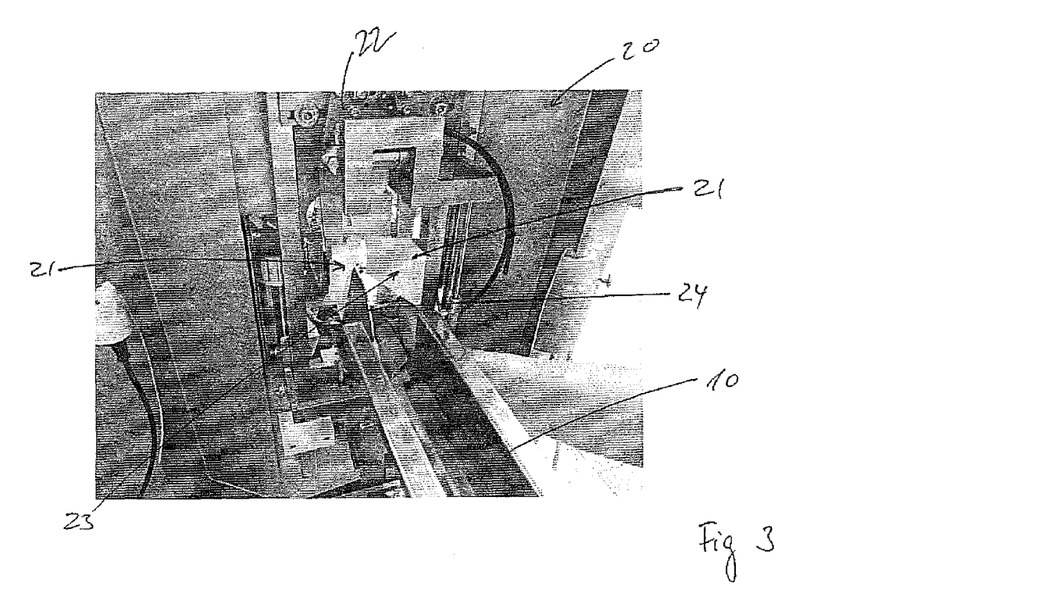
FIG. 3 illustrates a detail of the first station.

Turning to FIG. 3 a view of the first station 20 is depicted. In the lower right hand corner of the picture the in-feed channel may be seen by which the fish is introduced into the first station. The first station comprises means for engaging the fish, here in the shape of two plastic shoes 21 which shoes 21 may be moved up and down by the mechanism 22 and where means are provided for biasing the shoes 21 towards each other in order to fixate the fish relative to a vertical plane. The shoes 21 are both provided with a curved cross section 23 having a plane which plane is shaped and thereby the curve is formed such that the inner side of the shoe 23 will be more or less shaped as the contour of the fish. In this manner the shoes 21 will fixate the back part of the fish relative to the filleting machine 1.

Furthermore a vertical guide plate 24 arranged movably up and down is provided between the shoes 21. This plate will move up once a fish body is detected where said plate will move up where the abdomen is positioned. The plate 24 pushes the fish body slightly upwards such that a firm contact is established between the shoes 21 and fish. As the fish moves on, the fish body is transferred to a vertical plane 31 see FIG. 5. The fish will ride on this vertical plane throughout the processing in the filleting machine.

Figure 4:
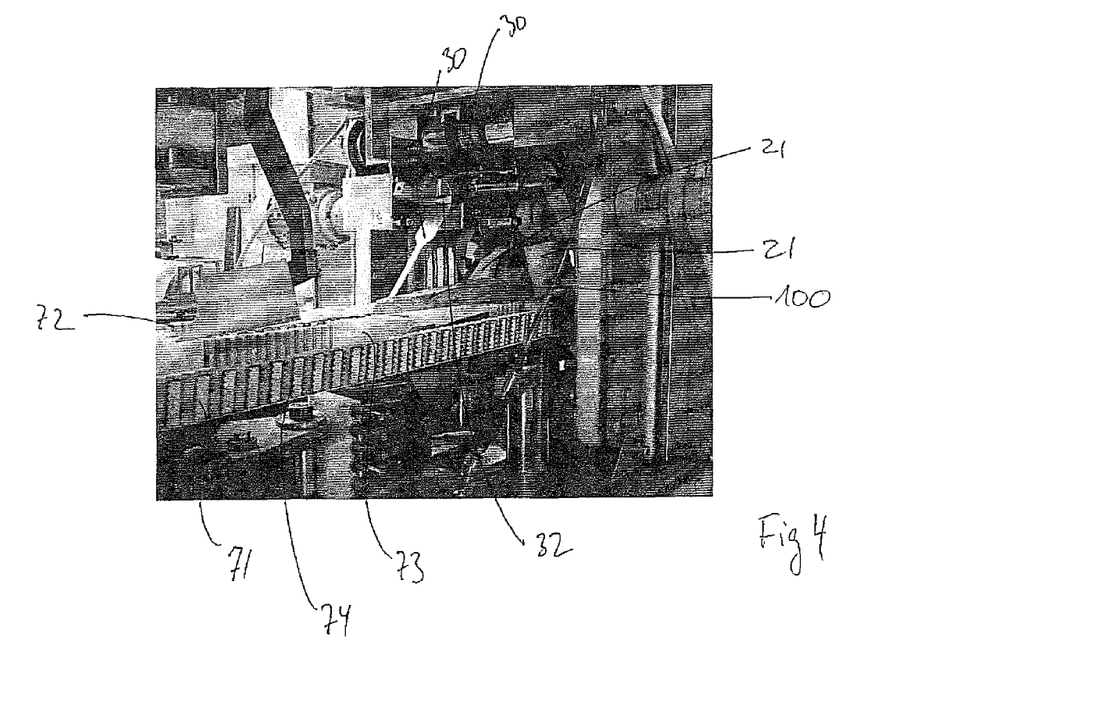
FIGS. 4 and 5 illustrates a detail of the second station.

Turning to FIG. 4 a first part of the second station is illustrated. The second station comprises means for detecting and registering the vertical extent of the fish, the lower edges as well as the back of the fish. In FIG. 4 is illustrated the means 30 for registering the position of the back of the fish. In this embodiment the fish is illustrated by a member 100. The means 30 comprises two members 30 which are pivotally mounted and biased towards the fish 100 whereby the rotational movement of the pivoting means 32 is used to calculate the vertical extent of the back of the fish.

Furthermore the shoes 21 from the first station are visible.

Additionally, endless belts 71, 72 are provided on either side of the path 100 of the fish through the machine whereby the endless belts will engage the side of the fish. Due to the rotation of the endless belts 71, 72 the fish will be transported through the different processes in the filleting machine. Furthermore it is easy to control and determine the fish' position in the process, by registering the progress of the endless belt.

The endless belts 71, 72 are provided with biasing means 73 which urges the endless belt into a firm contact with the fish to be processed. Also the surface of the endless belts 71, 72 is provided with spikes 74 in order to ensure a firm grip on the fish.

Figure 5:
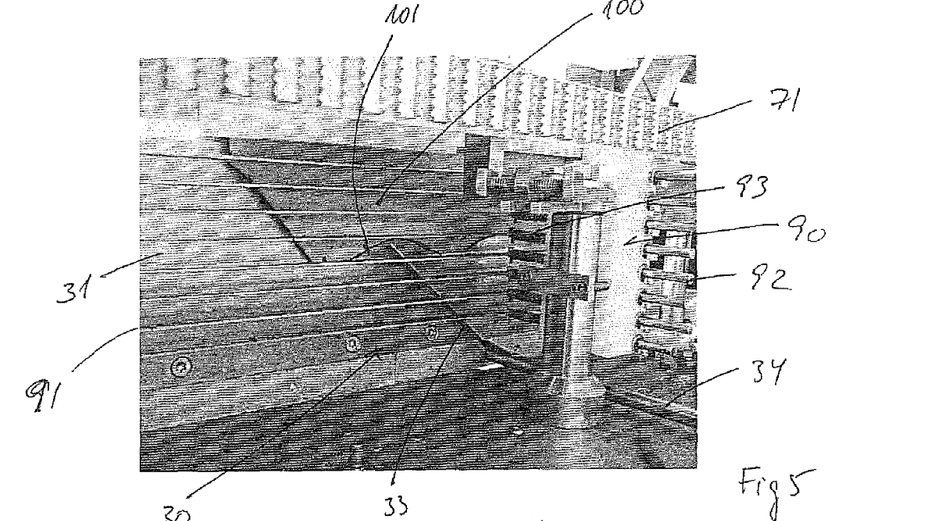

In FIG. 5 are illustrated the corresponding means for detecting and registering the lower edges of the fish. Again the means 30 comprise a pivotable member 33 arranged on an axis 34 such that the rotational movement of the axis 34 is translated into a contour of the lower extremities of the fish. In this embodiment the fish is illustrated by the member 100. In the example illustrated in FIG. 5 the lower edge of the fish 100 is provided with an exaggerated curvature in order to demonstrate that the pivotable member 33 will be influenced by the lower extremity 101 of the fish in order to pivot the axle 34 and thereby register the vertical extent of the fish.

Furthermore, biasing means 90 are provided in order to urge the fish 100 against the vertical plane 31. The biasing means comprise a number of horizontal stainless steel members 91 substantially arranged in parallel which members in one end are pivotably mounted about a vertical axis and in the opposite end is mounted to a biasing arrangement 92. Each biasing arrangement comprises an axle connected to the horizontal member 91 and interposed with a loaded spring 93 such that a substantially constant spring force will urge the horizontal member 91 towards the vertical plane 31.

Figure 6:
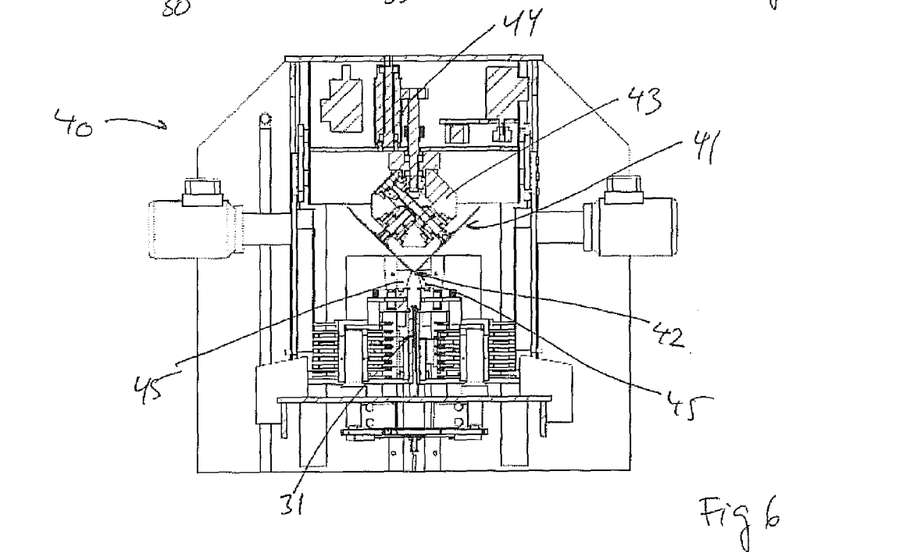
FIGS. 6 and 7 illustrates a cross section through the machine in the third and fourth stations.

In FIG. 6 is illustrated a cross section through the third station 40. The cutting means 41 in the third station is made up of two rotating knives arranged such that they intersect 42 at an angle. In this embodiment the rotating knives 41 are arranged in a hub 43 such that the angle between the two rotating knives 41 may not be altered. In other embodiments the hub 43 facilitates the possibility of adjusting the angle between the rotating knives 41 such that a wider or steeper angle may be provided depending on the fish species and/or sizes. A lifting mechanism 44 is also provided such that the hub and thereby the cutting planes may be vertically adjusted depending on the position of the back of the fish registered by the means explained with reference to FIG. 4.

In order to fixate the fish relative to the rotating cutting means 41 secondary shoes 45 are arranged immediately adjacent the cutting site such that the back of the fish is fixated as the cutting by the cutting means 41 is carried out. The secondary cutting shoes 45 are constructed in substantially the same manner as is described with respect to the shoes 21 discussed in connection with FIG. 3.

Figure 7:
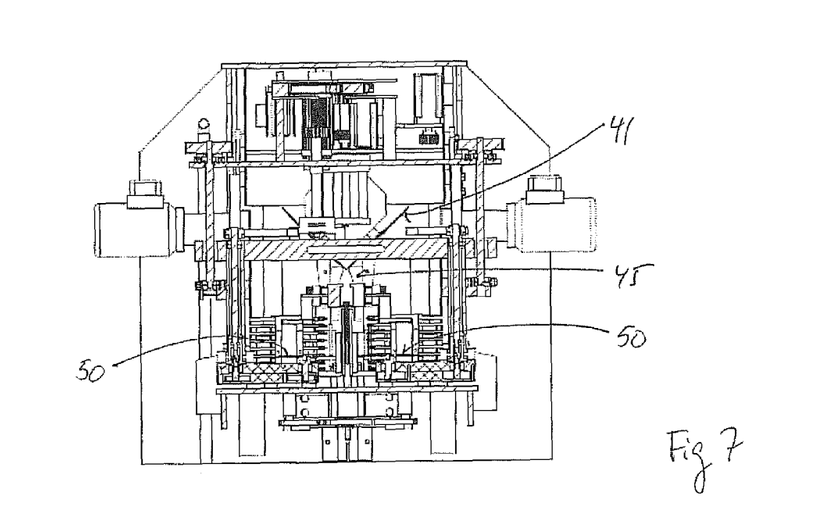

In FIG. 7 is illustrated a cross section through the fourth station where the articulated trimming knives 50 are illustrated in a position where the plane of the rotating knives 50 are horizontal. In order to illustrate the function of the trimming knives 50 the attention is directed towards FIG. 8.

Figure 8:
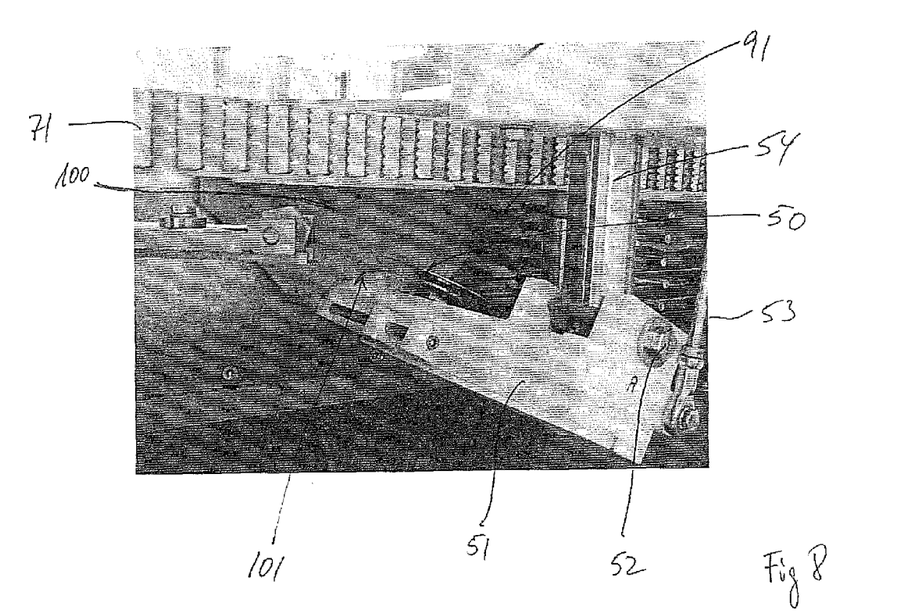
FIG. 8 illustrates a detail of the articulated cutting means.

FIG. 8 illustrates the left hand side knife arrangement seen in a downstream direction. The rotating knife 50 is arranged on a shoe 51 which shoe may pivot about an axis 52 in response to the movement of a manipulating arm 53 fastened off-centre on the shoe 51. Furthermore, the shoe 51 is mounted on a vertically adjustable piston 54 such that the shoe and thereby the knife 50 may be elevated or lowered as desired.

In the embodiment illustrated in FIG. 8 a theoretical fish side 100 is arranged in the filleting machine. The fish 100 has a desired cutting curve 101 which is determined by the data relating to the actual fish size and type and as determined by the detection means 30 in the second station. In this manner it is possible by means of the vertically adjustable piston rod 54 to arrange the shoe 51 in a horizontal position and pivot the shoe about the axis 52 such that the rotating knife 50 will be cutting along the optimal cutting curve 101.

Furthermore, the biasing means 91 and the endless belt 71 is visible in the illustration.

Figure 9:
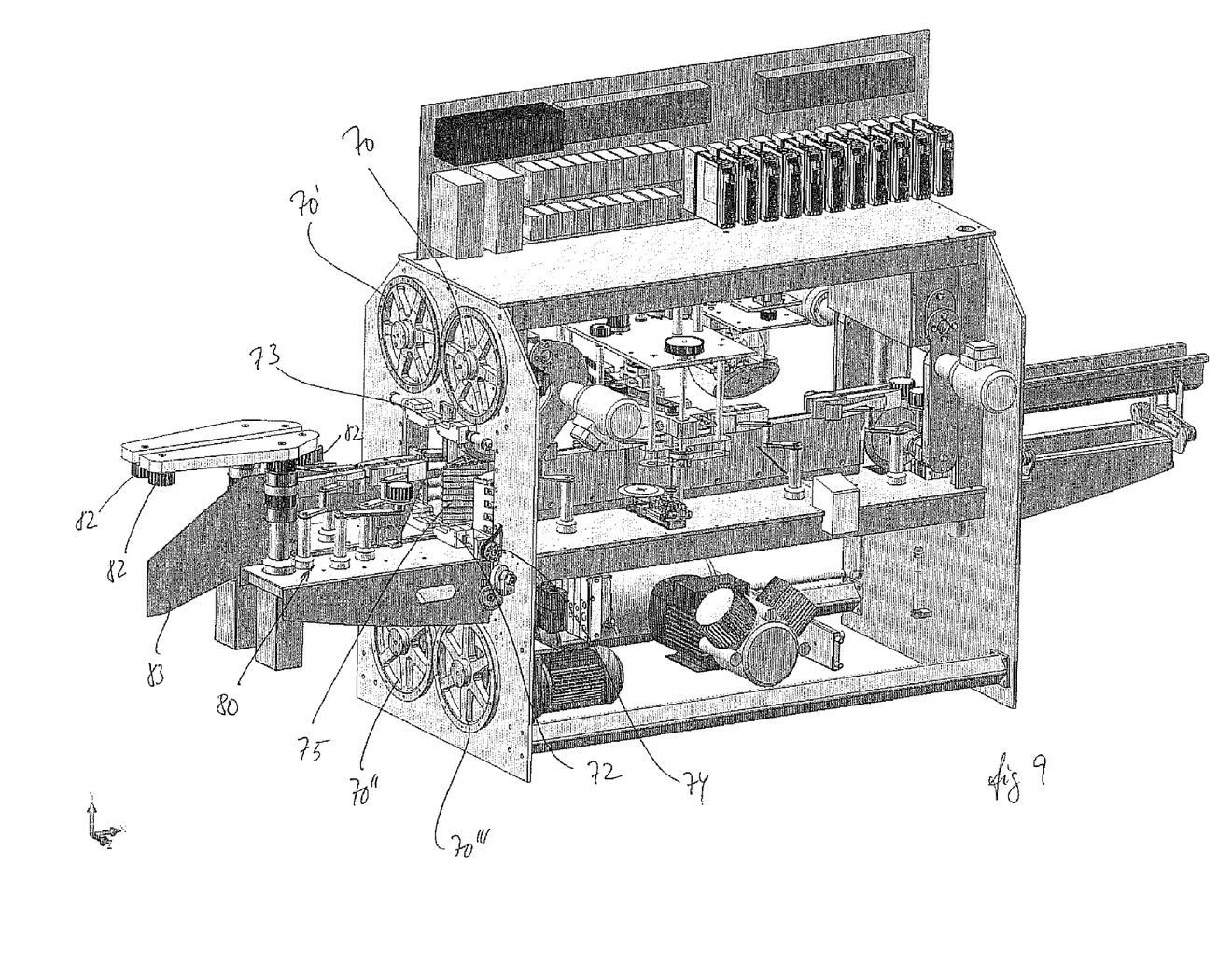
Figure 10:
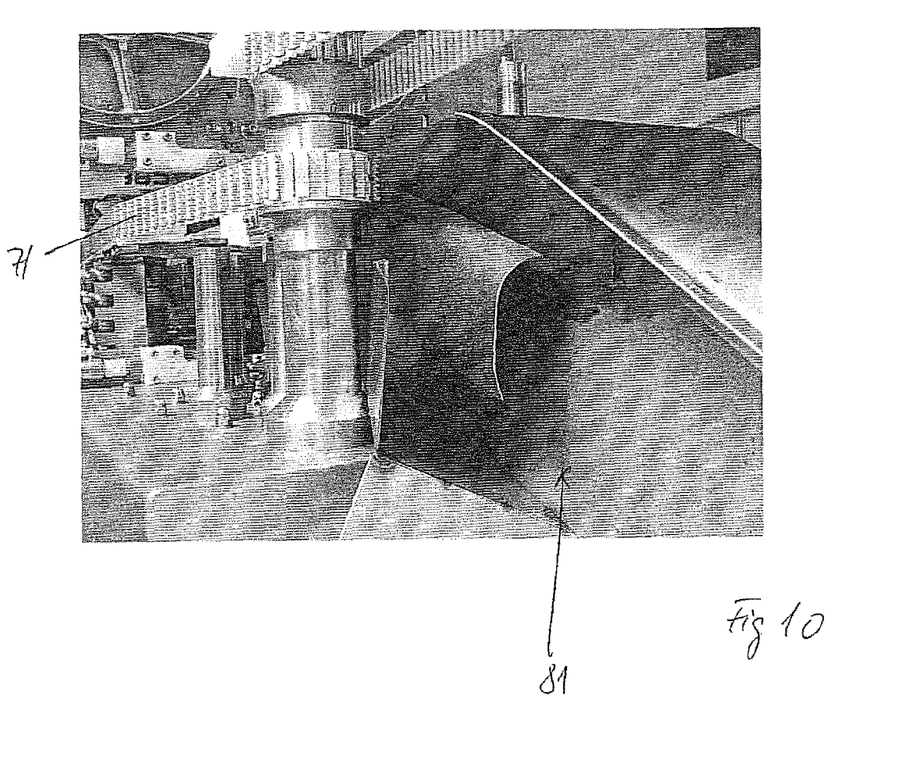
FIG. 10 illustrates a detail of the sixth station.

Turning to FIG. 9 the sixth station is visible. The fish progresses along the vertical plane and is guided by the biasing means 71 through the sixth station. Band-saws (not illustrated) are arranged between the band-saw wheels 70, 70', 70", 70''' such that one endless band-saw will be arranged around the wheels 70, 70''' and another endless band-saw belt will be arranged between the wheels 70', 70". Two substantially parallel band-saws will therefore be arranged in the cutting zone at the down-stream end of the biasing means 71. Secondary urging means 72, 73 are arranged in order to engage the endless band-saw belts and urge these towards each other such that the fish interposed between the secondary biasing means 72, 73 will not be completely parallel, but will be deformed due to the presence of the fish bone. These urging means 72, 73 are adjusted by means 74 such that an optimum cut and separation of the filet from the backbone is achieved. The arrangement is further explained in applicant's own earlier published PCT-application WO 2004/014140 and will not be further elaborated on at this point.

In FIG. 9 is furthermore illustrated a clearer view of the cutting means 26 in the first station. In this embodiment the cutting means 26 are in the shape of two rotating knives. The knives are arranged such that they cut from the anus through the tail fin, and upwards towards the main backbone/spine. The two knives therefore cuts on either side of the bones projecting downwards from the backbone/spine.

After the sixth station the seventh station 80 is arranged. The seventh station serves to handle the liberated and trimmed filets onto a further endless belt or further processing and at the same time to handle the liberated fishbone carcass.

The filets will be guided up to further processing by means of the endless conveyor belt 71 (not illustrated in FIG. 9, but see FIGS. 4, 5, 8). The endless belt will pull the fish filets onto a slide 81 whereby the fish filets will be gently turned such that their meat-sides will be facing upwards. Superposed the endless belt 71 is a further endless belt 82 (belt not illustrated in FIG. 9) which belt is arranged around drive wheels 82 such that the endless belt will create transportation in the same direction as the first endless belt 71. As the filets and the carcass are transported by the first endless belt 71 through the sixth and seventh stations a further vertical plane 83 will be disposed between the fish-bones and the fish back. The vertical plane 83 has an inclined upper edge such that the fish-bone will travel upwards and eventually be caught by the second endless belt suspended between the drive wheels 82. In this manner the fish-bone freed from fish-meat will be separated from the filets, and it may be possible to collect and discard the fish-bones separately from the rest of the process.

Above the invention has been explained with reference to a particular embodiment including specific devices for carrying out the independent method steps, but it should be contemplated that other cutting means, for example water jets, lasers and the like, may be substituted from rotating knives should a further machine arrangement within the scope of the appended claims find this to be optimal.

The embodiment described above is only for illustrative purposes, and the scope of the present invention shall only be limited by the appended claims.

The invention claimed is:

1. Fish filleting machine comprising a number of stations arranged in sequence for continuous filleting of fish, where the de-capitated and gutted fish is placed right side up, i.e. the back of the fish upwards and front end foremost in an in-feed channel where the machine further comprises:
   a first station comprising means for engaging the fish and centering said fish relative to a vertical plane of the machine, such that lower sides of the fish are arranged on opposite sides of said plane, and where cutting means are provided for cutting along the underside of the fish from the abdomen to the tail section;
   a second station comprising means for detecting and registering the vertical extent of the lower edges of the fish and the back of the fish;
   a third station comprising means for fixating the back of the fish, and cutting means for cutting slits in the back of the fish, said slits having an extent at least along either side of the protruding back fin;
   a fourth station comprising articulated cutting means, where said articulated cutting means are arranged on either side of the vertical plane, suitable for cutting/trimming at least a part of the lowermost sides and/or edges of the fish;
   a fifth station where upper cutting means are positioned along the vertical plane for cutting the fish meat free from the vertebrae of the fish;
   a sixth station comprising means for cutting vertically on either side of the vertebrae
   a seventh station for directing the bone-free fillets to further processing.

2. Fish filleting machine according to claim 1, wherein the engaging means in the first station are two guiding members having facing curved surfaces, substantially corresponding to the shape of an upper part of a fish' back, where said members are biased towards each other, and that a vertically arranged and moveable plate member is arranged, which plate member as a fish is introduced between the guiding members, is elevated inside the fish, thereby forcing and fixating the fish at a determined height.

3. Fish filleting machine according to claim 1, wherein in the second station the means for registering the vertical extent of the lower edges of the fish relative to the fish back comprises pivotal members, where the first pivotal member is arranged above the fish, in the vertical plane, where the member is biased to be in contact with the back of the fish, and where second pivotal members are arranged adjacent the lower edges of the fish, such that the second pivotal members may pivot about a substantially horizontal axis in order to register the vertical extent of the lower extent of the fish.

4. Fish filleting machine according to claim 3, wherein one or more biased horizontal ribs are arranged on either side of the vertical plane for urging the fish against the vertical plane.

5. Fish filleting machine according to claim 1, wherein in the third station the cutting means are two rotating knives, arranged at an adjustable oblique angle, and where fin guiding means for guiding the back fin are provided immediately upstream from the rotating knives.

6. Fish filleting machine according to claim 5, wherein the cutting means are arranged on a unit which unit may be elevated/lowered relative to the cutting position.

7. Fish filleting machine according to claim 1, wherein in the fourth station the articulated cutting means are independently controllable, where input from the detecting means in the second station is used to control the cutting line of the articulated cutting means.

8. Fish filleting machine according to claim 7, wherein the articulated cutting means is controllable in three dimensions, and where the cutters are rotating disc cutters, where the plane of the disc is controllable in response to input from the detection means.

9. Fish filleting machine according to claim 1, wherein in the fifth station the upper cutting means is in the shape of two rotating knives, their planes arranged in parallel, where the distance between the planes of the knives substantially corresponds to the width of the vertebrae/spine, and where the upper knives are guided by input from the detecting means in the second station in order to determine their cutting depth.

10. Fish filleting machine according to claim 1, wherein in the sixth station two mutually adjacent band saws are arranged on either side of the vertical plane, their cutting edges facing the fifth station, and where means are provided for urging the band saws towards each other.

11. Fish filleting machine according to claim 1, wherein two endless belts are arranged symmetrically about said vertical plane, i.e. one on either side, where each endless belt is arranged for rotation around two substantially vertical axles, such that the endless belt in use comes into engagement with the side of the fish, and urges the fish against the vertical plane, and as the belts are rotated the fish moves through the filleting machine.

12. Fish filleting machine according to claim 1, wherein a computing unit is provided, where said computing unit is pre-programmed with data relating to typical fish shapes, i.e. data relating to length, height, width, dependent on fish weight, where in a first mode an operator may select a certain weight class for a batch of fish to be treated, whereby the different stations are pre-positioned accordingly, and where input from the detection and registering unit is used as input in order to output correct control and operating parameters for the various means in the various stations or alternatively in a second mode, the width of the fish to be treated is registered and automatically entered as input in the software controlling the different stations, whereby the stations are controlled according to specific parameters relating to the present fish to be treated.

13. Fish filleting machine according to claim 1, wherein a further mechanism is provided downstream from the sixth station, which mechanism comprises an endless belt which is arranged to engage the fillets as they leave the sixth station, and mirror-image fillet guiding structure below said endless belt, such that each fillet is guided to further processing skin side down.

* * * * *